(12) United States Patent
Keukens

(10) Patent No.: US 10,999,102 B1
(45) Date of Patent: May 4, 2021

(54) FM SPECTRUM ESTIMATION RELATIVE TO ADJACENT CHANNEL

(71) Applicant: NXP B.V., Eindhoven (NL)

(72) Inventor: Erik Keukens, Eindhoven (NL)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 16/804,391

(22) Filed: Feb. 28, 2020

(51) Int. Cl.
*H04L 25/02* (2006.01)
*H04B 1/401* (2015.01)
*H04B 1/10* (2006.01)

(52) U.S. Cl.
CPC ............ *H04L 25/022* (2013.01); *H04B 1/401* (2013.01); *H04B 2001/1045* (2013.01)

(58) Field of Classification Search
CPC .................................................. H04L 25/022
USPC ......................................................... 375/316
See application file for complete search history.

(56) References Cited

U.S. PATENT DOCUMENTS

| | | | | |
|---|---|---|---|---|
| 4,969,207 A * | 11/1990 | Sakamoto | .............. | H03G 3/345 455/134 |
| 5,121,430 A * | 6/1992 | Ganzer | ................ | G08B 27/008 348/E7.025 |
| 6,144,290 A * | 11/2000 | Duval | ..................... | H04B 3/46 324/520 |
| 2002/0097813 A1 * | 7/2002 | Vaidyanathan | ....... | H04L 27/066 375/326 |
| 2004/0229590 A1 * | 11/2004 | Kubo | ................ | H04W 52/0238 455/307 |
| 2017/0019862 A1 * | 1/2017 | Goransson | .......... | H04W 52/146 |
| 2019/0319731 A1 * | 10/2019 | Mo | ...................... | H04J 11/0056 |

OTHER PUBLICATIONS

U.S. Appl. No. 16/804,358, filed Feb. 28, 2020, entitled: Adjacent Channel Suppression Based on Adjacent Channel Properties in FM Radio Broadcast Receivers. The Examiner is referred to the copending patent prosecution of the common Applicant (no attachment).

* cited by examiner

*Primary Examiner* — Lihong Yu
(74) *Attorney, Agent, or Firm* — Rajeev Madnawat

(57) ABSTRACT

In connection with a frequency modulated (FM) communications system, exemplary aspects concern processing a desired channel of a frequency modulated (FM) signal based on an indication of an amplitude-level difference between a measured amplitude of a desired channel in the FM broadcast signal and a measured amplitude of another (possibly-interfering) channel. Based on such amplitude-level difference indication, an approach is selected for estimating the frequency spectrum of the other (possibly-interfering) channel in the FM broadcast signal. The selected approach may differ depending on whether the amplitude-level difference corresponds to an amplitude-level difference for which a frequency spectrum of the desired channel may be determined via a coarse estimate or via a less-coarse estimate of the frequency spectrum of the other channel.

20 Claims, 2 Drawing Sheets

FM SPECTRUM ESTIMATION RELATIVE TO ADJACENT CHANNEL

Aspects of various embodiments are directed to FM (frequency modulation) communications and including, for example, FM radio broadcast communications systems in which a targeted reception channel is selected for capturing data carried by the FM, in the presence of one or more possibly-interfering adjacent channels.

In FM communications systems, tracking deviation is typically important for accurately receiving and capturing the information provided by the carrier frequency. To achieve this, it is often important to understand the surrounding frequency spectrum and avoid overlap and interference from other signals in the adjacent spectrum. Consider such an adjacent signal, for example, in the common FM radio broadcast systems. In such FM radio systems, interference often occurs from nearby broadcast radio signals (or channels) and the deviation of one of these adjacent broadcast signal may readily interfere with the other. The deviation or sometimes "instantaneous frequency deviation" in such systems may be sometimes referred to as the difference between the frequency of the carrier of the broadcast FM signal and its center frequency. In order to avoid overlap and interference from adjacent broadcast FM signals, this deviation has been estimated by measuring and averaging the mono-audio amplitude of the signal associated with the carrier frequency. Other deviation-estimation or tracking approaches may involve use of high-end commercially-available AC-DC converters, such as the QPD 25-12 Series, to pursue a more stable result but for many applications, the related expense is excessive.

Reliability for many of these deviation-measurement detectors may depend on the correct bandwidth selection of the measured channel. For some systems, an important consideration may be to ensure that the bandwidth selection of the measured signal has no energy of its adjacent channel and that no signal capture and/or measurement of the desired channel is influenced by any signal which is outside the bandwidth selected for receiving the desired channel. For example, if too narrow of a bandwidth for the measured channel is selected, the detector would indicate low modulation for this channel. Indicating such low modulation would in turn indicate that the bandwidth can be set even narrower. Depending on the used bandwidth control algorithm, this can cause a latch up of the measurement system.

Yet another previous approach is to implement a fast Fourier transform (FFT) algorithm on the input signal, but this oftentimes is a very costly solution and may not take advantage of certain available FM broadcast properties and/or distinguishable spectral components.

OVERVIEW OF THE DISCLOSURE

In accordance with the instant disclosure, various example embodiments are directed to issues such as those addressed above and/or as may be apparent from the following disclosure concerning detection in such frequency modulated (FM) communications contexts.

In one example, a specific embodiment is directed to a method involving reception of a desired FM channel, for example, an FM broadcast channel, in the presence of another adjacent channel which may interfere. The method includes the step of indicating, for the desired channel, an amplitude-level difference between a measured amplitude of the desired channel and a measured amplitude of the other channel that may be a potentially interfering channel, and a selection step in which circuitry in the radio selects a way to estimate the frequency spectrum of the other channel based on whether the amplitude-level difference at least primarily (if not entirely) corresponds to: (a) an amplitude-level difference for which a frequency spectrum of the desired channel may be determined via a coarse estimate of the frequency spectrum of the other channel, or (b) another amplitude-level difference for which a frequency spectrum of the desired channel may be determined via a less coarse estimate of the frequency spectrum of the other channel. Further, the method includes using, based on the selected way, an estimate of the frequency spectrum to provide data for the desired channel in the FM broadcast signal.

In another example, a specific embodiment is directed to an apparatus such as an FM receiver or FM communications system. The apparatus includes a signal-comparison circuit and signal processing circuitry. The signal-comparison circuit is to indicate, for a desired channel of an FM broadcast signal, an amplitude-level difference between a measured amplitude of a desired channel in the FM broadcast signal and a measured amplitude of another channel in the FM broadcast signal that may be a potentially interfering channel. The signal processing circuitry is to select a way to estimate the frequency spectrum of the other channel based on whether the amplitude-level difference at least primarily corresponds to: (a) an amplitude-level difference for which a frequency spectrum of the desired channel may be determined via a coarse estimate of the frequency spectrum of the other channel, or (b) another amplitude-level difference for which a frequency spectrum of the desired channel may be determined via a less coarse estimate of the frequency spectrum of the other channel. Based on the way which is selected, an estimate of the frequency spectrum is used to provide data for the desired channel in the FM broadcast signal.

In other specific examples, to estimate if the signal of an adjacent channel impacts the signal of interest, the spectrum of the adjacent channel is monitored and in some instances, this occurs regularly and/or continuously. In more specific examples, the level difference between the wanted and unwanted channel is used to determine the reliability with which the spectrum can be estimated, and in other specific examples, an adaptive spectrum estimate is developed.

In yet another example, deviation measurement is realized when only one adjacent channel is present, by reducing the likelihood of breakthrough by signal/interference from the adjacent channel by first separating the positive and negative aspects of the carrier-signal components and then using the minimum of these as the deviation.

The above discussion/summary is not intended to describe each embodiment or every implementation of the present disclosure. The figures and detailed description that follow also exemplify various embodiments.

BRIEF DESCRIPTION OF FIGURES

Various example embodiments may be more completely understood in consideration of the following detailed description in connection with the accompanying drawings, in which.

Figure 1:
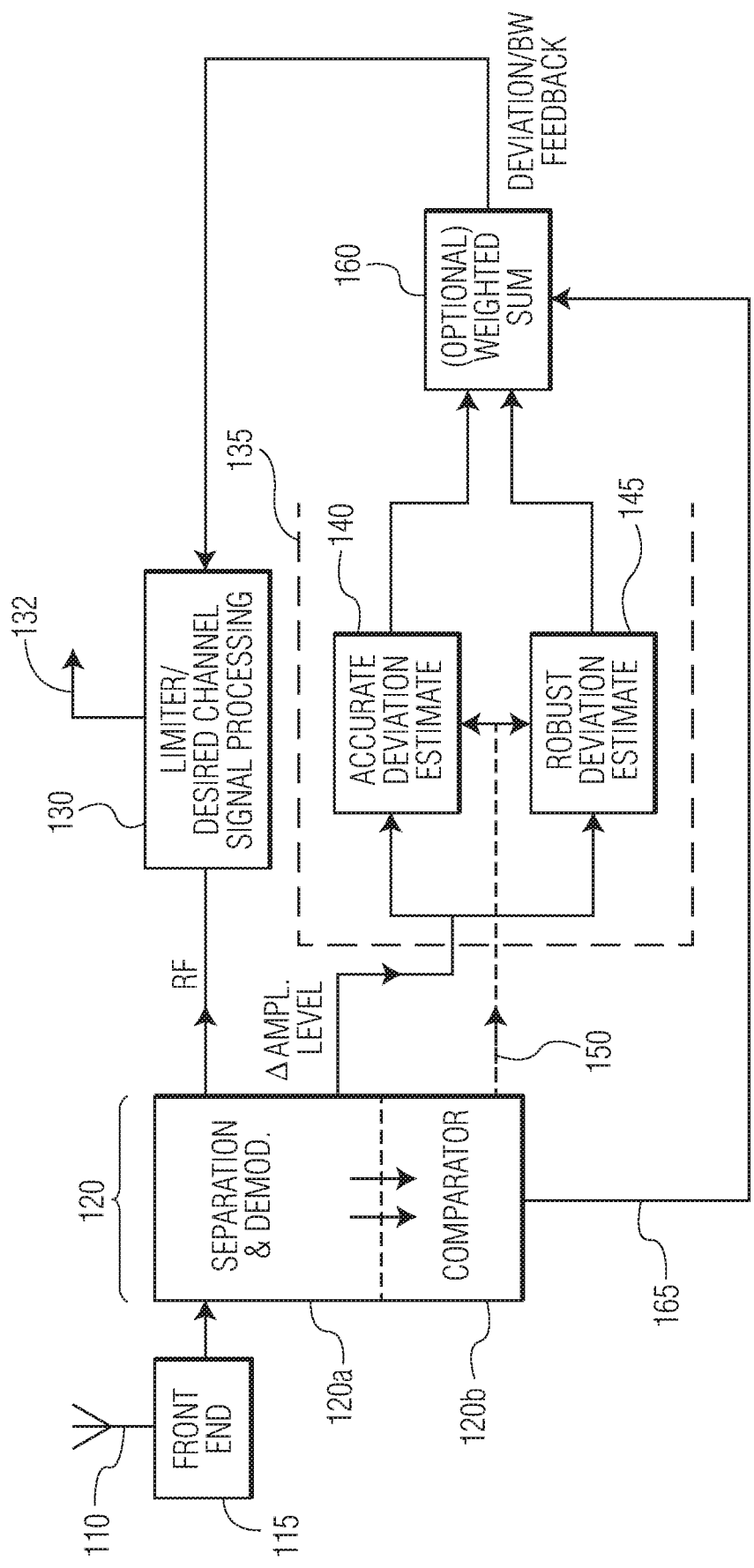
FIG. 1 is a system-level block diagram illustrating an example circuit configured in accordance with the present disclosure.

While various embodiments discussed herein are amenable to modifications and alternative forms, aspects thereof have been shown by way of example in the drawings and will be described in detail. It should be understood, however, that the intention is not to limit the disclosure to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION

Aspects of the present disclosure are believed to be applicable to a variety of different types of apparatuses, systems and methods involving estimation of a portion of an FM spectrum where the portion of the spectrum is relevant to a channel adjacent to a desired reception channel, such as in many types of FM communications systems in which an FM signal or channel has potential interference from one or more adjacent FM signals. While aspects of the instant disclosure may be used in connection with assessing/estimating bandwidth for receiving FM signals in a variety of communications system types, in certain example implementations aspects have been shown to be beneficial when used in the context of FM radio broadcast signals. While not necessarily so limited, various aspects may be appreciated through the following discussion of non-limiting examples which use such exemplary system-specific contexts.

Accordingly, the instant disclosure provides various specific examples with aspects and related details for discussion purposes. It should be apparent to one skilled in the art, however, that one or more other examples and/or variations of these examples may be practiced without all the specific details provided herein. In other instances, well known features have not been described in detail so as not to obscure the description of the examples herein. For ease of illustration, the same reference numerals may be used in different diagrams to refer to the same elements or additional instances of the same element. Also, although aspects and features may in some cases be described in individual figures, it will be appreciated that features from one figure or embodiment can be combined with features of another figure or embodiment even though the combination is not explicitly shown or explicitly described as a combination.

According to specific examples of the instant disclosure, embodiments are directed to or involve an FM broadcast signal in a frequency spectrum having bandwidth used for the broadcast which is related to the spectrum of the input signal for accurately capturing the carrier signal and is also related also to the spectrum of the FM signals of one or more adjacent signals as is often the case for FM radio broadcast signal, where the FM radio signals can fluctuate a lot and rapidly and thereby put at risk the reliability of information captured from the carrier of the desired signal.

In one specific example, embodiments are directed to methods involving an FM receiver or FM communications system. The method includes a signal-comparison which may be performed, for example, by logic and/or signal processing circuitry within receiver circuitry. The signal-comparison is used to indicate, for a desired channel of an FM broadcast signal, an amplitude-level difference between a measured amplitude of a desired channel in the FM broadcast signal and a measured amplitude of another channel in the FM broadcast signal that may be a potentially interfering channel. The receiver circuitry selects a way to estimate the frequency spectrum of the other channel based on whether the amplitude-level difference at least primarily, if not entirely, corresponds to one of two categories. First, an amplitude-level difference for which a frequency spectrum of the desired channel may be determined via a coarse estimate of the frequency spectrum of the other channel. Second, another amplitude-level difference for which a frequency spectrum of the desired channel may be determined via a less coarse estimate of the frequency spectrum of the other channel. Based on which category, the way to estimate the frequency spectrum of the other channel is selected. Subsequently, this estimate is used to provide data for the desired channel in the FM broadcast signal.

In another specific example, embodiments are directed to an apparatus such as an FM receiver or FM communications system. The apparatus includes a signal-comparison circuit and signal processing circuitry. The signal-comparison circuit is to indicate, for a desired FM broadcast channel, an amplitude-level difference between a measured amplitude of a desired channel in the FM broadcast signal and a measured amplitude of another channel in the FM broadcast signal that may be a potentially interfering channel. The signal processing circuitry is to select a way to estimate the frequency spectrum of the other channel based on whether the amplitude-level difference at least primarily corresponds to: (a) an amplitude-level difference for which a frequency spectrum of the desired channel may be determined via a coarse estimate of the frequency spectrum of the other channel, or (b) another amplitude-level difference for which a frequency spectrum of the desired channel may be determined via a less coarse estimate of the frequency spectrum of the other channel. Based on the selected way or approach, an estimate of the frequency spectrum is used to provide data for the desired channel in the FM broadcast signal.

According to yet other specific examples of the instant disclosure, to provide an accurate estimate relative to the signal of an adjacent channel and to mitigate its impacts on the signal of interest (or desired channel), the spectrum of the adjacent channel is monitored multiple times for dynamically selecting the way to estimate the frequency spectrum of the other channel relative to the amplitude-level difference corresponding to one of the two categories as above. This may occur in (near) real time, and in some instances, this may occur regularly and/or continuously and/or in response to an interrupt upon certain of the RF circuitry detecting an anomaly in the RF spectrum.

In certain more-specific examples, the method and circuitry process the frequency modulated (FM) broadcast signal by assessing or discerning whether, and/or categorizing, the amplitude-level difference as corresponding to an amplitude-level difference for which a frequency spectrum of the desired channel may be determined via a coarse estimate of the frequency spectrum of the other (possibly-interfering) channel in the FM broadcast signal, or as corresponding to another amplitude-level difference for which a frequency spectrum of the desired channel may be determined via a less coarse estimate of the frequency spectrum of the other (possibly-interfering) channel in the FM broadcast signal. Further, the system employing the method and/or circuitry may regularly monitor the indication of amplitude-level difference between a measured amplitude of a desired channel in the FM broadcast signal and a measured amplitude of another (possibly-interfering) channel in the FM broadcast signal, so as to repeat the step of selecting in order to provide estimates of the frequency spectrum in a manner that regularly and/or automatically adapts activity in the relevant portion of the frequency spectrum.

Consistent with the above aspects and in yet other detailed examples, another important aspect of the instant disclosure uses circuitry to determine the amplitude-level difference as corresponding to an amplitude-level difference for which a frequency spectrum of the desired channel may be determined via a certain type of estimate of the frequency spectrum of the other (possibly-interfering) channel in the FM broadcast signal. In response, the circuitry uses a quasi-peak-detection circuit (on a demodulated FM or MPX signal) to facilitate in providing the estimate of the frequency spectrum to provide data for the desired channel in the FM broadcast signal. In such detailed examples the likelihood that a neighboring channel impacts (possibly interferes with) the wanted channel depends on properties including, as examples, current position of the signal (e.g., a signal with low frequency content), and the spectral content of the modulated signal (e.g., as may be measured using the MPX signal). In connection with the above-discussed aspects, a reliable estimation of these properties for the following conditions is available when the measured signal is significantly stronger than the wanted channel; and when the measured signal is of similar strength as the wanted channel.

In certain applications, it may be appreciated that the measured channel is the channel of which the system is configured to extract information, and this wanted channel is the channel the total system wants to listen to without impact of the measured channel. Moreover, in such example applications, the condition where the wanted channel is significantly stronger than the measured channel is not taken into account. This follows because in that condition the measured channel does not impact the wanted channel, so its deviation is less relevant.

Once the level of the measured signal is significantly stronger the current position may be estimated by a quasi-peak detector on the demodulated MPX signal. The peaks must be measured in the direction where the wanted signal is located.

When the signals are of equal strength an estimate of the current position (deviation value/MPX) may be made. To estimate the modulation the amplitude is averaged (e.g., positive and negative modulation peaks are measured in the same way). As the peaks are averaged over the positive and negative side, the effects of breakthrough of the adjacent channel is reduced. The recovery time constant is fast, and the attack time can be reduced, thereby reducing the impact of the breakthrough.

A measure of the higher frequency content in the MPX may also be used to estimate the relevant portion of the spectrum. This higher frequency content leads to more Bessel components. This is detected with very fast timing to quickly adjust to changing signal conditions. There is no compensation for the low frequency content/position in the measurement. The fast timing takes care of this.

Based on the described parameters the spectrum of the FM signal can be estimated. By completing the Bessel series for the signal components the FM spectrum would be unlimited. However, this may be avoided is the transmitters limit their signal content such that the generated output spectrum is limited (as may be required in some countries). For countries that employ/require such limitations, broadcast equipment may already equipped with measures to limit the spectrum and, according to the aspects of the instant disclosure, spectrum limitation in these systems may be controlled by adjusting the MPX signal as opposed to adjusting the output spectrum.

Accordingly, the spectrum based on the MPX may be estimated even in connection with such a spectrum-limiting systems. Assuming the level difference (between a measured amplitude of a desired channel in the FM broadcast signal and a measured amplitude of another possibly-interfering channel) can be determined/estimated, aspects of this disclosure may be used to estimate the likelihood of distortion of the wanted channel at a certain frequency difference from the measured channel as a result of the current modulation on the measured channel.

As described above in connection with certain examples, the relevant spectrum may be measured more reliably for a stronger signal. In that case the deviation into one direction is measured to determine its impact on that adjacent channel. In case the level is smaller, the system automatically moves to measuring the average modulation of both upper and lower side. With this approach a possible breakthrough of the adjacent is not weighted as heavily as it might be with a system not using the above-described aspects and properties of the FM broadcast signal. The breakthrough measures only to a slight degree as compared to the modulation of the wanted channel.

Turning now to the drawing, FIG. 1 is a system-level block diagram illustrating a specific example of a circuit configured in accordance with aspects of the present disclosure. The block diagram 100 may be applicable, for example, to an FM signal transmitted via an FM trunked communication system, a radio broadcast system or via another wireless system conveying information by FM signals, with other aspects of the radio-signal receiver now shown. Using an FM radio broadcast system as an example, FIG. 1 may correspond to a block diagram of FM channel receiving circuitry showing an antenna 110 and RF front-end circuit 115 including more-specific circuit stages (e.g., mixer and oscillator not shown in FIG. 1) for presenting the received signal to circuitry 120 having RF signal-separation and demodulation circuitry 120a and comparison circuit 120b. The RF front-end circuit 115 may be implemented, e.g., in a radio-signal receiver configured to receive FM radio signals, across a relatively wide spectrum (e.g., spanning signals from one hundred to a few (or several) hundred kHz on either side of the desired channel).

The circuitry 120a and 120b is configured (e.g., via RF filters such as bandpass filters) to provide different output signals. These different output signals include a first modulated RF signal corresponding to a desired channel, to a desired-channel processing circuit 130 which then, as appropriate for the application, may apply a limiter and discriminator for capturing the information provided by the carrier signal as may be developed further via the signal 132 (e.g., in connection with audio-information processing circuitry) as may be conventional.

The circuitry 120 generates other of these different output signals, as paired signals corresponding to signal properties of the desired channel and of the other channel, from within the RF signal-separation and demodulation circuitry 120a for presentation to the comparison circuit 120b. As exemplary properties, these paired signals may include an indication of the measured amplitude of the desired channel in the FM broadcast signal and a measured amplitude of the other (potentially-interfering) channel in the FM broadcast signal. In response, the comparison circuit 120b compares the paired signals to indicate degree of difference between the measured amplitude of the desired channel in the FM broadcast signal and the measured amplitude of the other channel in the FM broadcast signal. In an exemplary receiver circuitry using analog logic and/or signal processing circuitry to perform the comparison, the circuitry selects a way to estimate the frequency spectrum of the other channel based on whether the amplitude-level difference at least primarily, if not entirely, corresponds to one of two categories: an amplitude-level difference for which a frequency spectrum of the desired channel may be determined via a coarse estimate of the frequency spectrum of the other channel via block 140; and another amplitude-level difference for which a frequency spectrum of the desired channel may be determined via a less coarse estimate of the frequency spectrum of the other channel via block 145. Based on which category, the frequency spectrum of the other channel is estimated accordingly by block 140 coarsely or by block 145 in a more accurate manner. As shown at line 150, the comparison circuit 120b may provide a signal to select which of the blocks 140 or 145 is to be used for estimating the deviation, and only one of the respective outputs from the blocks 140 and 145 is used as feedback for indicating to the desired-channel processing circuit 130 an appropriate bandwidth (e.g., upper and/or lower frequencies) to be used for limiting the bandwidth (e.g., by a limiter) in demodulating the RF signal provided by the circuitry 120.

The above-noted feedback loop may be implemented only to indicate the signal level as an indication of the measured relative strength of the two channels. One way of determining the level for this feedback is not to have it influenced by the selected bandwidth so that no oscillation in the loop occurs. In many applications, this feedback signal is a relatively slow-changing signal, so it is not important so the timings of its measurement is not critical and it need not be measured only after selectivity of the coarse v. fine approach above. In any event, with this estimate being used to set the bandwidth for providing data from the desired channel in the FM broadcast signal, this feedback may be considered important for many applications.

The circuit blocks 120 and 130 may be integrated as part of a single signal analyzer (e.g., signal processor) or may be implemented as distinct circuits including as examples one or more of the following types of circuits: digital-signal processors to process after the MPX signal is processed by an analog-digital converter, in analog form using FET-based amplifiers and filters; and/or using a combination of such digital-signal processing and analog-signal processing circuits. An example of such circuitry using a combination of digital-signal processing and analog-signal processing circuitry, which may be programmed/configured to correspond to circuits as shown in FIG. 1, is the SAF4000 Processor available from NXP B.V. This commercially available product may be configured to implement wideband radio receivers for the above-discussed FM signal processing including, for example, FM radio broadcast signals per standards in the USA (with 100 kHz channel spacing) and with such counterpart spacing requirements as in other countries such as Europe, China and elsewhere.

The approach exemplified in FIG. 1 therefore detects if the desired channel is interfered with based on the spectrum of the adjacent channel. As indicated, this may be achieved by knowing how close the spectrum of the possible-interfering channel is to the desired channel by knowing the (relative) amplitude of the possible-interfering channel. In applications where the spectrum of the FM signal(s) can fluctuate a lot and rapidly, it may be helpful to estimate the (relative) amplitude of the possible-interfering channel regularly or continuously so as to provide a (near) real time or adaptive spectrum estimation. In this way, the level difference between the desired (or wanted) channel and unwanted channel determines the reliability with which the spectrum may be estimated.

When the signal or level of the adjacent channel is strong, it has a large impact on the neighboring channel and thus an accurate estimate of the spectrum is important. When the signal is weak, the impact on the adjacent channel is limited and thus an error has less impact. Consistent with this bifurcated spectrum-estimation approach, in another specific example embodiment the comparison circuit 120b may provide an indication of the level difference to a weighted sum block 160 which may then implement an algorithm to combine the outputs from circuits 140 and 145 in order to provide the feedback to circuitry 130. For example, this indication of the level difference may indicate if the measured signal level is significantly stronger then the level of the desired channel and/or if the measured signal is of similar strength as the desired channel. For certain examples in accordance with the instant disclosure, however, the condition where the wanted channel is significantly stronger than the measured channel need not be taken into account; this follows since in that condition the measured channel does not impact the wanted channel and, therefore, the corresponding deviation is less relevant. Once the level of the measured signal is significantly stronger, the current position can be easily estimated by a quasi-peak detector on the demodulated signal such as an FM radio signal sometimes referred to as MPX signal; this may be achieved, for example, by comparing with the peaks measured in the direction where the desired signal is located (e.g., relative to one or more predetermined thresholds).

When the signals are of equal strength, or sufficiently within a degree of similarity as may be indicated by programmed thresholds, an estimate of the current position (deviation value/MPX) is made. To estimate the modulation the amplitude may be averaged, with positive and negative modulation peaks being measured in the same way. As the peaks are averaged over the positive and negative side, the effects of breakthrough of the adjacent channel are reduced. Moreover, the recovery time constant is faster to recovery from a breakthrough faster; as there is twice the energy to attack, a faster recovery is allowed. For this same reason the attack time can be reduced which in turn reduces the impact of the breakthrough.

In certain other examples, a measure of the higher frequency content in the demodulated (MPX) signal is also used to estimate the spectrum. This higher frequency content leads to more Bessel components. This is detected with very fast timing to quickly adjust to changing signal conditions. There is no compensation for the low frequency content/position in the measurement. The fast timing address this issue.

FIG. 1. further also depicts an optional weighting-summation block 160 in connection with another method for a system or circuit to process an FM signal, also based on a step of initially examining an amplitude-level difference between a measured amplitude of the desired channel in the FM signal and a measured amplitude of another adjacent channel, possibly interfering with the desired channel. This approach with block 160 is used as an alternative to using only one of the respective outputs as feedback for indicating an appropriate bandwidth. In this example, both outputs from the blocks 140 and 145 may be processed as weighted values and summed, within block 160, to indicate an appropriate bandwidth to be used for limiting the bandwidth in demodulating the RF signal.

With the above-described circuits of FIG. 1 along with an indication of the amplitude-level difference as a measured/estimated output of the circuitry 120b at line 165, block 160 may be used to select whether to use a coarse estimate algorithm or a (more accurate) less-coarse estimate algorithm of the frequency spectrum. The block 160 provides output data as feedback to the circuitry 130, as a weighted summation of the amplitude-level indications so as to reflect the estimated deviation, or the difference between the frequency of the carrier of the broadcast EM signal and its center frequency. As one example, the weighting sum may be implemented and viewed from a mathematical/logic-circuit perspective with the control input being a value in the range [0,1], where one input to the block 160 is multiplied by this control value and the other input to the block 160 is multiplied by 1-control, with the output being the sum of these two results and corresponding to the deviation estimate. Using this deviation estimate for the feedback, the bandwidth is appropriately adjusted as a function of the RF spectrum for accurately and quickly processing the desired channel (via its center frequency) relative to the adjacent (possibly-interfering) channel or, as may be applicable (e.g., by replicating such illustrated signal-processing blocks), multiple adjacent (possibly-interfering) channel s.

Based on the above-described parameters, the spectrum of the FM signal can be estimated. If the Bessel series is completed for the signal components the FM spectrum will be unlimited. However to improve the situation transmitters limit their signal content such that the generated output spectrum is limited. Laws in many countries do require this. As most countries do require such limitations, oftentimes conventional FM broadcast equipment is already equipped with measures to limit the spectrum. Spectrum limitation in these systems are controlled by adjusting the MPX signal not by adjusting the output spectrum. For that reason the spectrum may be estimated based on the MPX even when such a system is included. As the spectrum can be measured most reliably for a stronger signal, in that case the deviation into one direction is measured to determine its impact on that adjacent channel. In case the level is smaller, the system automatically moves to measuring the average modulation of both upper and lower side. With this approach the degree of a possible breakthrough of the adjacent channel is not weighted as heavily as with the approach described previously for FIG. 1 (as the breakthrough would only measure a small amount compared to the modulation of the desired channel).

Figure 2:
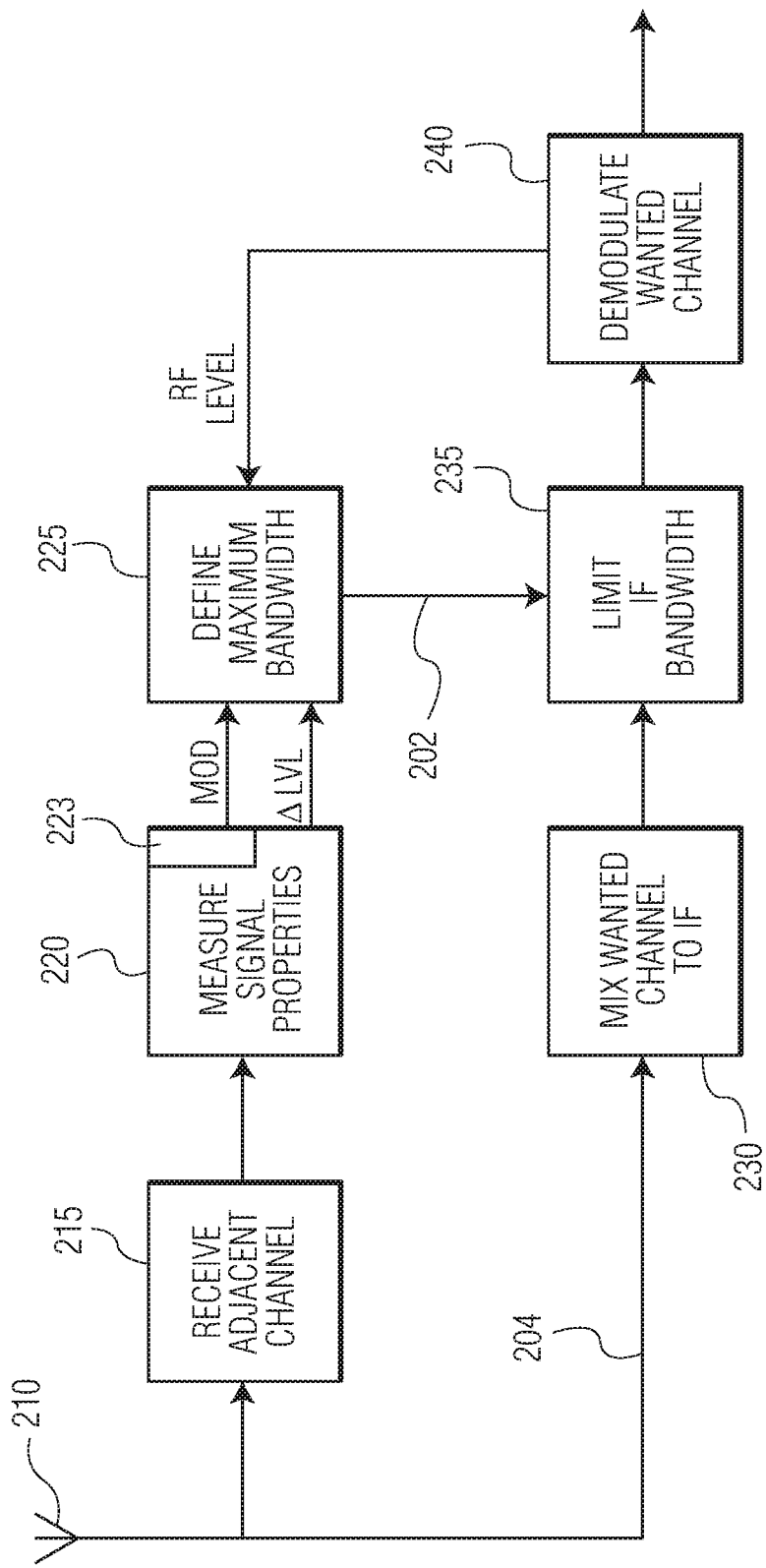
FIG. 2 is a block diagram of an example apparatus, including a specific example FM signal processing circuit, also in accordance with the present disclosure, in which one or more of the disclosed embodiments may be used and applied.

FIG. 2 shows another specific example approach for providing bandwidth control via line 202 for processing a desired channel from an antenna 110, based in part on processing of an adjacent channel as also depicted in FIG. 1. FIG. 2 shows related signal-flow of an example FM broadcast radio receiver system, also in accordance with the present disclosure and in which one or more of the disclosed embodiments (as with FIG. 1) may be implemented. Also as described above in connection with FIG. 1, similar circuitry may be used such as the above-mentioned SAF4000 from NXP Semiconductors N.V. The circuitry of FIG. 2 may also be implemented as a chipset with an integrated software defined-radio approach capable of covering a variety of global broadcast audio standards, including AM/FM, DAB+, DRM(+) and HD.

As shown at the left side of FIG. 2, a bandwidth control system for an FM radio signal uses the antenna 210 to pick up the FM signal at a frequency range corresponding to the spectrum inclusive of the desired FM channel and at least one channel adjacent. Also at the front end of the radio receiver or apparatus of FIG. 2, RF-filtering and amplification circuitry 215 is used to present the FM signals, which are relevant to the frequency range, to a signal-measurement/detection circuit 220. From the circuit 220, the relevant measured signal properties, for example, including an indication of FM modulation level of the other (possibly-interfering) channel and the amount of bandwidth (or modulation index), are presented to a bandwidth (BW) control circuit 225 which is used to set the maximum bandwidth based on these measured signal properties.

Concurrent with the operation of the RF-filtering and amplification circuitry 215, an FM signal mixer 230 is used to down convert the received FM signal an intermediate frequency (IF) as is conventional. An output of the FM signal mixer 230 provides an IF signal to bandwidth selective/controlling circuitry 235 including, for example, a band-pass filtering circuit. Using the maximum bandwidth as provided by the circuit 225, the circuitry 235 provides a selected bandwidth range for the IF signal to be processed by a demodulator 240. The demodulator 240 outputs the demodulated signal of the desired channel and is further configured to provide the RF level to the bandwidth (BW) control circuit 225 so as to drive the selection (e.g., dynamically) of whether to use the coarse deviation-estimate approach or the less-coarse deviation-estimate approach, as described above in connection with FIG. 1.

The requirements on such bandwidth control systems are less strict as for the wanted channel if nobody is listening to the signal. The adjacent channel signal can be distorted by the wanted channel as well as another adjacent channel which may be one channel further away as long as it does not significantly impact the modulation spectrum estimation.

As an example implementation consistent with the instant disclosure, the bandwidth of the wanted channel is based on the modulation of the adjacent channel. The larger the modulation measured on the adjacent channel, the more narrow the bandwidth of the wanted channel. Any of a number of methods may be used to measure the adjacent-channel modulation where more reliable detection obviously leads to a more reliable system. In some FM signal broadcasts, the broadcasting spectrum is in principle not limited; however, the energy of the signal decreases with a larger distance from the carrier. In certain specific examples, a higher level difference means that for the same amount of measured modulation, a larger part of the spectrum is stronger than the wanted channel and thus does impact the wanted channel; and by combining level indication with modulation index, an increased level of reliability is achieved.

Another implementation of a system that uses such level indication and modulation of the adjacent channel is the multiplication of level and the modulation values. A function to shape the effect of the level is required for optimal control. For example, with this approach the selected bandwidth becomes: BW=MaxBW−LevelAdjacent*ModulationAdjacent. It is appreciated that the properties of the function may change for changing grid/adjacent distance.

In certain non-limiting experimental-test embodiments, the above-described approaches for estimating deviation has realized impressive results. One such system embodiment has been tested successfully with several types of audio (including short audio bursts, with silence in between, wide spectrum audio, etc.). In all tested situations, the desired channel has been maintained as clean of interference/breakthrough due to the adjacent channel. This has been realized successfully in this clean regard even with the bandwidth, associated with the content of the adjacent channel, fluctuating, and also with: several settings of the signal level difference; testing performed on 100 kHz adjacent channel, 200 kHz adjacent channel and 300 kHz adjacent channel; and where the disturbing channel was at 100 kHz, while an even stronger channel was available at 200 kHz difference.

The skilled artisan would recognize that various terminology as used in the Specification (including claims) connote a plain meaning in the art unless otherwise indicated. As examples, the Specification describes and/or illustrates aspects useful for implementing the claimed disclosure by way of various circuits or circuitry which may be illustrated as or using terms such as blocks, modules, device, system, unit, processor, converter, controller, and/or other circuit-type depictions (e.g., reference numerals/blocks in FIGS. 1 and 2 depict a block/module as described herein). Such circuits or circuitry are used together with other elements to exemplify how certain embodiments may be carried out in the form or structures, steps, functions, operations, activities, etc. For example, in certain of the above-discussed embodiments, one or more modules are discrete logic circuits or programmable logic circuits configured and arranged for implementing these operations/activities, as may be carried out in the approaches shown and discussed in the instant disclosure. In certain embodiments, such a programmable circuit is one or more computer circuits, including memory circuitry for storing and accessing a program to be executed as a set (or sets) of instructions (and/or to be used as configuration data to define how the programmable circuit is to perform), and an algorithm or process as described above is used by the programmable circuit to perform the related steps, functions, operations, activities, etc. Depending on the application, the instructions (and/or configuration data) can be configured for implementation in logic circuitry, with the instructions (whether characterized in the form of object code, firmware or software) stored in and accessible from a memory (circuit).

Based upon the above discussion and illustrations, those skilled in the art will readily recognize that various modifications and changes may be made to the various embodiments without strictly following the exemplary embodiments and applications illustrated and described herein. For example, methods as exemplified in the Figures may involve steps carried out in various orders, with one or more aspects of the embodiments herein retained, or may involve fewer or more steps. Such modifications do not necessarily depart from the true spirit and scope of various aspects of the disclosure, including aspects set forth in the claims.

What is claimed is:

1. A method comprising:
for a desired channel of a frequency modulated (FM) broadcast signal, indicating an amplitude-level difference between a measured amplitude of the desired channel and a measured amplitude of another channel that may be a potentially interfering channel;
selecting a way to estimate the frequency spectrum of the other channel based on whether the amplitude-level difference at least primarily corresponds to: (a) an amplitude-level difference for which a frequency spectrum of the desired channel may be determined via a coarse estimate of the frequency spectrum of the other channel, or (b) another amplitude-level difference for which a frequency spectrum of the desired channel may be determined via a less coarse estimate of the frequency spectrum of the other channel; and
based on the selected way, using an estimate of the frequency spectrum to provide data for the desired channel in the FM broadcast signal.

2. The method of claim 1, further including categorizing the amplitude-level difference as corresponding, or discerning whether the amplitude-level difference corresponds, to an amplitude-level difference for which a frequency spectrum of the desired channel may be determined via a coarse estimate of the frequency spectrum of the other channel in the FM broadcast signal, or as corresponding to another amplitude-level difference for which a frequency spectrum of the desired channel may be determined via a less coarse estimate of the frequency spectrum of the other channel in the FM broadcast signal.

3. The method of claim 1, further including categorizing the amplitude-level difference as corresponding to an amplitude-level difference.

4. The method of claim 1, further including discerning whether the amplitude-level difference corresponds, to an amplitude-level difference.

5. The method of claim 1, further including assessing the amplitude-level difference relative to an amplitude-level difference for which a frequency spectrum of the desired channel may be determined via a coarse estimate, or via a less coarse estimate, of the frequency spectrum of the other channel in the FM broadcast signal of the frequency spectrum of the other channel in the FM broadcast signal.

6. The method of claim 1, further including regularly monitoring the indication of amplitude-level difference between a measured amplitude of the desired channel in the FM broadcast signal and a measured amplitude of the other channel, and repeating the step of selecting in order to provide estimates of the frequency spectrum adaptively.

7. The method of claim 1, further including repeatedly: monitoring the indication of amplitude-level difference between a measured amplitude of the desired channel in the FM broadcast signal and a measured amplitude of the other channel, and performing the step of selecting.

8. The method of claim 1, wherein the steps of indicating an amplitude-level difference and of selecting a way to estimate the frequency spectrum of the other channel, are performed by circuitry of an FM receiver and wherein the desired channel and the other channel correspond to FM broadcast signals for which the FM receiver is configured to monitor.

9. The method of claim 1, further including determining the amplitude-level difference as corresponding to an amplitude-level difference for which a frequency spectrum of the desired channel may be determined via a certain type of estimate of the frequency spectrum of the other channel in the FM broadcast signal, and in response using a quasi peak-detection circuit to facilitate in providing the estimate of the frequency spectrum to provide data for the desired channel in the FM broadcast signal.

10. The method of claim 1, wherein the method is used as part of an FM broadcast communications system having broadcasting transmitters which limit their signal content such that the generated output spectrum is limited by law.

11. The method of claim 1, wherein indicating an amplitude-level difference and selecting a way to estimate the frequency spectrum of the other channel, in certain instances when the amplitude-level difference is greater than a predefined higher-level difference threshold and thereby indicating that a larger part of the spectrum is stronger than the desired channel, the frequency spectrum of the other channel is estimated based on an indication of the amplitude level being combined with a related modulation-index property.

12. The method of claim 1, further including measuring or estimating signal properties corresponding with amplitude levels of the desired channel and of the adjacent channel and in response, using the signal properties to facilitate the step of selecting.

13. An apparatus comprising:
a signal-comparison circuit to indicate, for a desired channel of a frequency modulated (FM) broadcast signal, an amplitude-level difference between a measured amplitude of a desired channel in the FM broadcast signal and a measured amplitude of another channel in the FM broadcast signal that may be a potentially interfering channel; and
signal processing circuitry to:
select a way to estimate the frequency spectrum of the other channel based on whether the amplitude-level difference at least primarily corresponds to: (a) an amplitude-level difference for which a frequency spectrum of the desired channel may be determined via a coarse estimate of the frequency spectrum of the other channel, or (b) another amplitude-level difference for which a frequency spectrum of the desired channel may be determined via a less coarse estimate of the frequency spectrum of the other channel; and
use an estimate of the frequency spectrum to provide data for the desired channel in the FM broadcast signal based on the selected way.

14. The apparatus of claim 13, wherein the signal processing circuitry is to use a quasi-peak-detection circuit on a demodulated FM or memory protection extension (MPX) signal to facilitate in providing the estimate of the frequency spectrum to provide data for the desired channel in the FM broadcast signal.

15. The apparatus of claim 13, wherein the signal processing circuitry is to assess whether a neighboring channel impacts or possibly interferes with the desired channel based on a current position of a signal corresponding to the neighboring channel.

16. The apparatus of claim 13, wherein the signal processing circuitry is to assess whether a neighboring channel impacts or possibly interferes with the desired channel when a signal corresponding to the neighboring channel is measured as being significantly stronger, as estimated using a predetermined threshold of dissimilarity, than a signal associated with the desired channel.

17. The apparatus of claim 13, wherein the signal processing circuitry is to assess whether a neighboring channel impacts or possibly interferes with the desired channel when a signal corresponding to the neighboring channel is measured as being similar, as estimated using a predetermined threshold of similarity, as a signal associated with the desired channel.

18. The apparatus of claim 13, further including circuitry to determine whether the amplitude-level difference corresponds to an amplitude-level difference for which a frequency spectrum of the desired channel may be determined via a certain type of estimate of the frequency spectrum of the other channel in the FM broadcast signal.

19. The apparatus of claim 13, wherein determining the amplitude-level difference as corresponding to an amplitude-level difference for which a frequency spectrum of the desired channel may be determined via a certain type of estimate of the frequency spectrum of the other channel in the FM broadcast signal, and in response using a quasi-peak detection circuit to facilitate providing the estimate of the frequency spectrum and to provide data for the desired channel in the FM broadcast signal.

20. The apparatus of claim 13, further including a signal-measurement circuit to generate signal properties, for the desired channel and/or the adjacent channel, associated with the amplitude-level difference and to use, in response, the signal properties to facilitate the selection.

* * * * *